RAUNITIDINE UV Spectrum

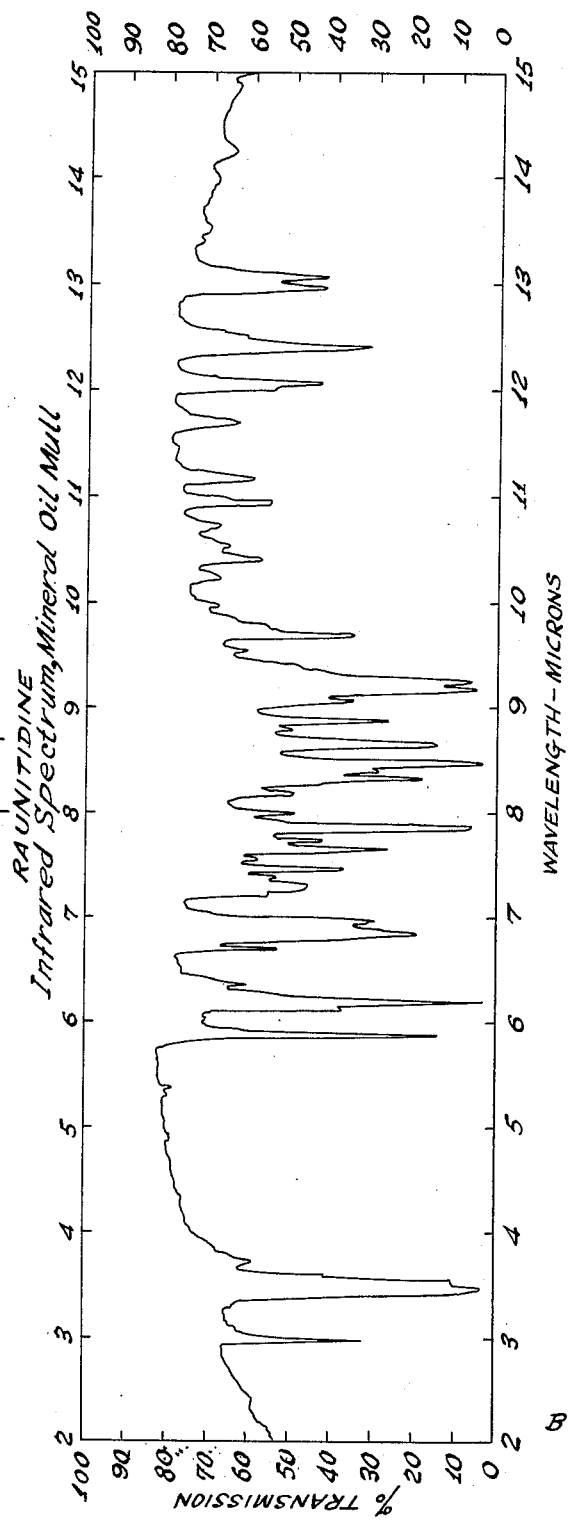

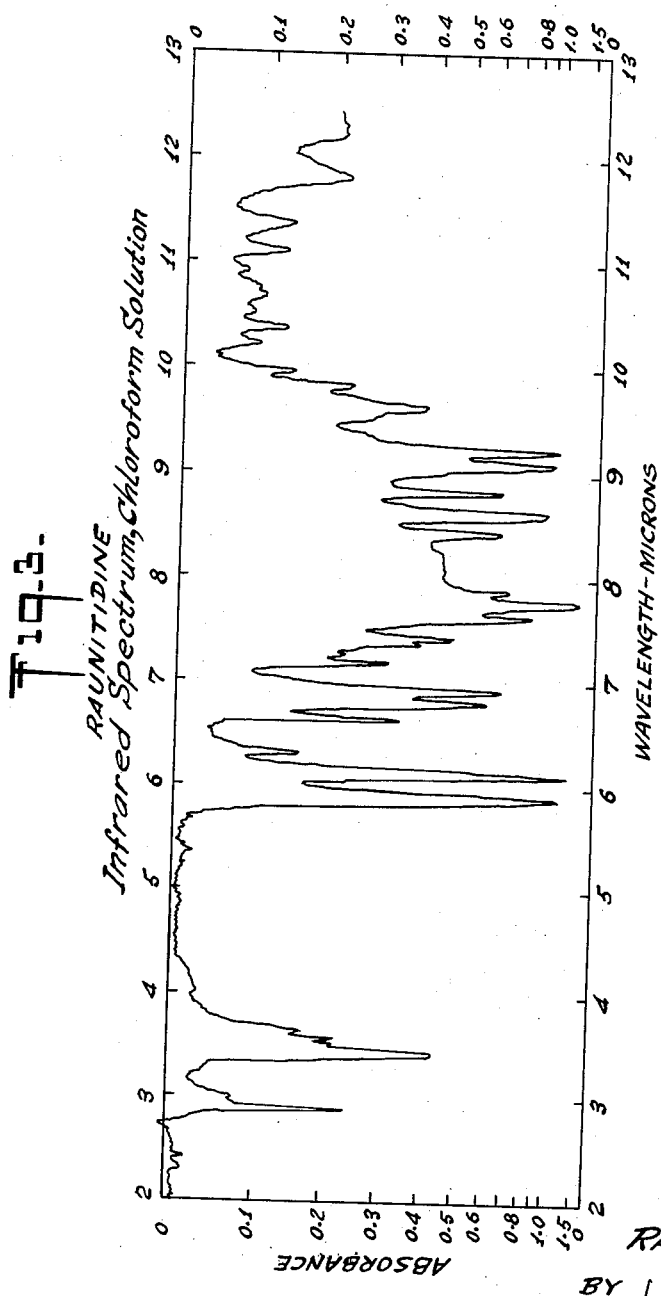

3,072,664
EXTRACTION OF RAUNITIDINE
Ralph Salkin, Jackson Heights, N.Y., assignor to S. B. Penick & Company, New York, N.Y., a corporation of Delaware
Filed Aug. 12, 1960, Ser. No. 49,223
6 Claims. (Cl. 260—294.3)

This invention relates to a new compound and more specifically to an alkaloid and derivatives thereof in the class of 11-methoxy-δ-yohimbines having the structural formula:

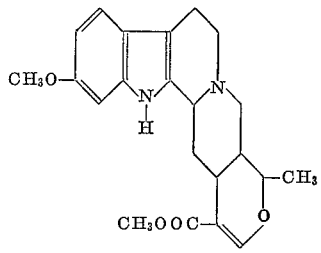

The new compound, which I have isolated from the conjugated form in which it occurs in the leaves of *Rauwolfia nitida*, has not previously been isolated or described. Its general ultraviolet and infrared spectra show it to be an 11-methoxy-δ-yohimbine. It is, however, distinguishable from other known and structurally related yohimbines and specifically from the other known 11-methoxy-δ-yohimbine stereoisomers by its melting point, optical rotation, and its characteristic deviations in the "finger-print" zone of its infrared spectrum. Its derivatives, such as its acid addition salts and hydrolysates similarly distinguish and characterize it. In addition, it possesses an analgesic and sedative activity not exhibited by the related compounds.

Three 11-methoxy-δ-yohimbine stereoisomers have previously been reported. They are reserpinine, iso-reserpinine and tetraphylline. Reserpinine [Schlittler et al.; Experientia, 10, 133 (1954)] has been reported by other authorities under several names including raubasinine [Haack, Naturwissenschaft, 41, 214 (1954)]; Alkaloid A [Neuss et al.; J.A.C.S., 76, 3234 (1954)]; Substance 1 [Popelach, Naturwissenschaft, 40, 625 (1954)] and Alkaloid C [Hoffman, Helv. Chem. Acta., 37, 849 (1954)]. Iso-reserpinine has been described by Stoll [Helv. Chem. Acta., 38, 270 (1955)] and tetraphylline was reported by Djerassi [Chem. & Industry, 55, 627 (1957)] and by Neuss (Tetrahedron, 1, 328 (1957)].

Since the above mentioned compounds and my novel compound are stereoisomers, they possess identical ultraviolet spectra and their infrared spectra exhibit absorption bands indicating the 11-methoxy-δ-yohimbine structure. The known stereoisomers have been characterized and many of their physical properties are set forth in Physical Properties of Indole and Dihydroyindole Alkaloids (Fourth edition) published by the Eli Lilly Research Laboratories.

Table 1 compares the melting points and specific rotations $[\alpha]_D^{25}$ of the know isomers with the new isomer for which the name raunitidine is proposed.

TABLE 1

| Alkaloid | M.P., °C. | $[\alpha]_D^{25}$ (pyridine) degree |
|---|---|---|
| Reserpinine | 243–244 | −101 |
| Iso-Reserpinine | 225–226 | −5 |
| Tetraphylline | 220–223 | −35 |
| Raunitidine | 275–276 | −30.6 |

FIGURE 1 is the ultraviolet spectrum characteristic of all the 11-methoxy-δ-yohimbines including raunitidine. The characteristic regions are as follows:

| Max 229 mμ | log e 4.6 |
| Min 282 mμ | log e 3.6 |
| Max 298 mμ | log e 3.8 |

FIGURE 2 is the curve of the infrared spectrum of raunitidine in the solid state from a mineral oil "mull."

FIGURE 3 is the infrared spectrum of raunitidine in chloroform solution. The characteristic bands and their significance will be discussed below.

Figure 1:
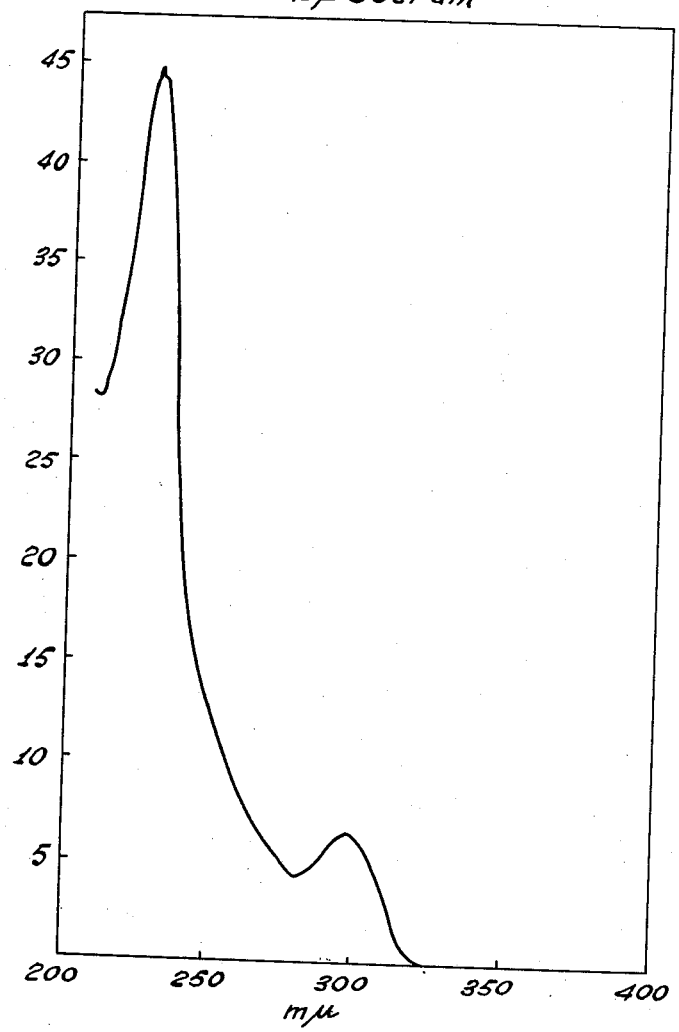

Comparison of the physical properties of my new alkaloid with verified samples of the known 11-methoxy-δ-yohimbine isomers as shown in Table 1 and FIGURES 2 and 3, showed it to be distinctly different from such known isomers. Its exact stereo-configuration is not known.

Raunitidine is obtained from the total alkaloid extract isolated from the leaves of *Rauwolfia nitida*. It is isolated from the weakly basic alkaloid extract separated from the total alkaloids by pH partition. The weakly basic alkaloidal fraction is that fraction which is extractable by chloroform from weakly acidic solutions. The pH range for this extraction is preferably 3.00–4.5, although it can also be extracted from more basic solutions.

Raunitidine can be separated and isolated from the total alkaloids or from the above-mentioned fractions by chromatography or by salt formation.

The total alkaloid extracts may be obtained from the ground leaves by extraction with aqueous acidic solutions, with lower aliphatic alcohols, or with water-immiscible solvents. Because the acidic and alcoholic extracts contain large quantities of non-alkaloidal extractives which must be removed, water-immiscible organic solvent extraction process is preferred. In this latter process, prior to the extraction with the organic solvent, the leaves are mascerated with an alkaline material.

In addition to concentration by pH partition, I have found that it is also possible to fractionate and separate raunitidine from the total alkaloid mixture by a two step process. By refluxing the total alkaloids with methanol, and then cooling to harvest the crystals which separate, a major portion of the available raunitidine is obtained. This precipitate contains about 75% raunitidine. The impurities are primarily the other 11-methoxy-δ-yohimbine isomers such as resepinine. These compounds can be removed by treatment with hydrochloric acid and formation of crystalline hydrochloric acid addition-salts. Raunitidine can then be recovered by liberating the free base.

Total Alkaloid Extract

In the preferred total alkaloidal extraction procedure, the leaves are first mascerated with sodium carbonate, trisodium phosphate, ammonia water, or similar alkaline materials. The lkali-moistened drug is then extracted with a water-immiscible organic alkaloid solvent such as the chlorinated hydrocarbon, or the aromatic hydrocarbon solvents, or mixtures of each or both. Among such solvents are included chloroform, ethylene chloride, methylene chloride, trichlorethylene, tetrachloroethylene, tetrachlorethane, benzene, toluene, xylene, and ethylbenzene.

The solvent extract is then contacted with an acidic solution to form the water-soluble acid-addition salts of the alkaloids. Mineral acids are useful for this step with phosphoric acid preferred, but solutions of the stronger organic acids may also be used. The alkaloids, in the form of their salts, are dissolved in the aqueous acidic phase and the organic solvent is discarded.

(At this point the pH partition may be made by adjustment of the acidic solution to the pH range 3.0–4.5 with alkali and shaking out the alkaloids which precipitate, into chloroform.)

The total alkaloidal extracts are prepared by the complete neutralization of the acid solutions with alkali (pH above 7) followed by extraction with chloroform. The chloroform extracts are then dried and the chloroform removed by distillation. Yield varies with growing condition and season of the year within which the leaves are picked.

Concentration

By refluxing the total alkaloidal extract with methanol, this amorphous extract can be crystallized and concentrated. Upon cooling, a crystalline material is precipitated from the methanol. This material represents 70–90% of the raunitidine present in the total alkaloids. By this simple procedure, in a single step, most of the desired material is concentrated. This concentrate assays about 70–80% raunitidine. This concentration effect is most pronounced with methanol but is also observable with ethanol.

Purification

This concentrate can be further purified by dissolving it in hot glacial acetic acid, adding methanol, and then chilling. The crystalline raunitidine base (N.B. not the acetate) which is deposited, assays about 90% purity.

Alternately, the alcohol-precipitated crystalline concentrate is disolved in warm alcoholic-HCl (acid to Congo paper). This solution is allowed to cool and is chilled. Raunitidine hydrochloride (one mol alcohol) recovered by such crystallization procedure assays 98% purity in the first crystal crop. Repeated recrystallization results in even purer material, substantially free from the other isomers.

Raunitidine

The solvated-raunitidine hydrochloride salt can be decomposed by alkaline solutions to the pure raunitidine base which is extracted and removed from a methanol:chloroform (1:9) mixture. Raunitidine so prepared, has the physical constants shown in Table 1 and FIGURES 1, 2, and 3.

Referring to FIGURE 2, the IR spectrum of raunitidine in the solid state in mineral oil mull, the following band assignments can be made:

—NH ------------------------------------------ 2.95
Heterocyclic E ring with an emol-ester chromophore ------------------------------------------ 5.85
11-methoxylated benzene ring ---------------- 6.10
Heterocyclic E ring with an enol-ester chromophore ------------------------------------------ 6.17
1, 2, 4 tri substituted benzene---------------- 12.05
Characteristic raunitidine doublet--------- 12.95, 13.05

Referring to FIGURE 3, representing the IR spectrum of raunitidine in solution in chloroform, the following band assignments can be made:

—NH ------------------------------------------ 2.90
3-alpha hydrogen configuration ----------- 3.51, 3.65
Heterocyclic E ring with emol-ester chromophore -- 5.90
11-methoxy-benzene ring ---------------------- 6.09
Heterocyclic E ring with the emol-ester chromophore ------------------------------------------ 6.13
Characteristic band not found in the other isomers- 9.10

Raunitidine derivatives can be prepared in the form of acid addition salts of non-toxic pharmaceutically acceptable acids. The hydrochloride and nitrate salts are specifically described in the examples below, but other salts including the sulfate, phosphate and oxalate have been made. When crystallized from alcoholic solutions, the salts form solvated crystals containing one mol of the alcohol.

Raunitidine can be hydrolyzed to raunitidic acid having the structural formula:

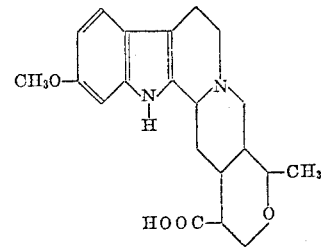

by hydrolysis with 4 N KOH in ethanol. The hydrolysis takes 4 hours under reflux conditions. This acid when reacted with ammonia water forms an ammonium salt.

In addition to the novel analgesic qualities, raunitidine causes a reduction in blood pressure that is not antagonized by atropine, but is likewise not potentiated by either epinephrine or acetylcholine. In addition it is relatively non-toxic to warm blooded animals.

Raunitidine and its salts may be combined with other therapeutic substances which it may antagonize or potentiate. Such combinations are well known in the art for the purposes of eliminating side effects or enhancing therapeutic properties of drugs without increasing toxicity.

The invention will be more particularly described by reference to the appended examples. These examples teach specific procedures and are not intended to limit the scope of the invention with regard to the source of the original starting material, the total leaf extract, the solvents used, or the salts formed in the subsequent purification operations. Substitution of equivalent materials is possible within the scope of the invention as outlined above and specifically described below.

EXAMPLE 1

Total Alkaloid Extract of Rauwolfia nitida Leaves

Moisten 5-kilos of R. nitida leaves, ground to approximately 40-mesh, with 10% aqueous sodium bicarbonate solution. Extract the moistened leaves with benezene in a Soxhlet apparatus. Concentrate the benzene extract, in vacuo, to a heavy syrup and then dilute this concentrate with 4-liters of ether containing 10% of methanol. Remove the alkaloids from this mixture by shaking with 5 x 500 ml. portions of M/2 phosphoric acid. Decolorize and filter the combined acid waters. Extract the total alkaloids from the acid waters by alkalinizing with 10% sodium carbonate solution in the presence of 2-liters of chloroform. Re-extract the aqueous phase with three small portions of fresh chloroform and then discard the aqueous phase. Combine the chloroform extracts, wash with water and then dry over sodium sulfate. Distill the chloroform to obtain a dry residue.

EXAMLE 2

Crystallization of Crude Raunitidine Concentrate

Suspend the amorphous alkaloids obtained according to Example 1 (approximately 150-grams) in 500 mls. of methanol and reflux this mixture for 15-minutes, cool the mixture and then chill in crushed ice. Filter the crystal slurry and wash the cake with cold methanol. This crude preparation represents approximately 20% by weight of the total alkaloids. Such crude raunitidine crops have melting points in the range of 250–270 and an $[\alpha]_D^{25}$ of $-25°$ (c.=1% in pyridine) $\pm 10°$.

EXAMPLE 3

Concentration in Glacial Acetic Acid

Suspend 30 grams of the crude raunitidine obtained from Example 2 in glacial acetic acid. Heat, decolor and filter the solution. To the hot acid solution add 250 ml. of methanol and reflux the solution for 5-minutes. After refluxing, chill and recover the crystalline slurry of raunitidine base; wash the recovered base with cold methanol. The recovered raunitidine base has an $[\alpha]_D^{25}$ —38.5° (c.=1% in pyridine). This indicates a raunitidine purity of approximately 90%. (It should be noted that the base and not an acetate is obtained.) This method of purification removes the bulk of pigments and a large part of the associated reserpinine. The remainder of reserpinine and other impurities may be removed as set forth below.

EXAMPLE 4

Purification of Raunitidine as the Hydrochloride

Thirty grams of the methanol concentrate obtained according to Example 2 is suspended in a liter of anhydrous ethanol (2B denatured). The suspension is warmed to 50° Centigrade and sufficient ethanolic hydrochloric acid (10%) is added to make the solution acid to Congo red indicator paper. The solution is charcoaled, filtered and then refrigerated. The raunitidine hydrochloride precipitates and is filtered from the ethanol solution. When twice re-crystallized and dried in vacuo it has the following properties:

Melting point _____ 228–230° C. (decomp.).
$[\alpha]_D^{25}$ _____ 107.6 (1%-MeOH).
Analysis _____ $C_{22}H_{26}O_4N_2 \cdot HCl \cdot C_2H_5OH$.
Calc. _____ C, 61.99; H, 7.15; N, 6.03; Cl, 7.63.
Found _____ C, 61.98; H, 7.36; N, 6.31; Cl, 7.85.

EXAMPLE 5

Conversion of Raunitidine Hydrochloride to Nitidine

The hydrochloride is converted to the base by dissolving the salt in 10-parts of a 9:1 chloroform-methanol mixture and neutralizing with a 10% sodium carbonate solution. After washing with water the chloroform-methanol solution of the base is distilled to dryness and the base is crystallized from methanol. Upon re-crystallization the pure raunitidine (99+%) material has the following properties:

Melting point ____ 275–276° C.
$[\alpha]_D^{25}$ _____ —30.6° (c.=1% in pyridine).
Analysis _____ $C_{22}H_{26}O_4N_2$.
Calc. _____ C, 69.09; H, 6.85; N, 7.33; $OCH_3$ 16.23.
Found _____ C, 69.05; H, 7.12; N, 7.33; $OCH_3$ 16.27.

Raunitidine corresponding to the above analysis was subjected to ultra-violet and infrared spectrography. The resultant ultra-violet spectrograph is identical with that of FIGURE 1. The solvent used was ethanol—

Max. 229 m$\mu$    log e 4.64
Min. 282 m$\mu$    log e 3.63
Max. 298 m$\mu$    log e 3.80

The infrared curve of a mineral oil is identical with that of FIGURE 2 and shows the characteristic medium strong doublet at 12.95$\mu$ and 13.05$\mu$ not observed in any of the stereoisomers. In addition FIGURE 3 the infrared spectrum of raunitidine, dissolved in chloroform solution (1%), shows an absorption band at 9.10$\mu$ which differentiates it from reserpinine, iso-reserpinine and tetraphylline.

EXAMPLE 6

Preparation of Raunitidine Nitrate (Methanol Solvate)

Dissolve 200 milligrams of raunitidine base obtained in Example 5 in 10 ml. of dioxane with warming. Add 75 milligrams of ammonium nitrate dissolved in 10 ml. of methanol and acidify the solution with glacial acetic acid. The crude nitrate obtained by chilling this solution is re-crystallized from methanol and dried to constant weight 80° C. The methanol-solvated nitrate obtained has the following properties:

Melting point _____ 165–170° C. (decomp.).
$[\alpha]_D^{25}$ _____ —107° (1% MeOH).
Analysis _____ $C_{22}H_{26}O_4N_2 \cdot HNO_3 \cdot CH_3OH$.
Calc. _____ C, 57.85; H, 6.55; N, 8.80.
Found _____ C, 58.08; H, 6.48; N, 9.07.

EXAMPLE 7

Raunitidine by pH Partition

Wet one kilo of *Rauwolfia nitida* leaves, ground to 40 mesh, with a 10% aqueous sodium carbonate solution, and let stand for 6 hours. Extract the wet leaves with benzene. Remove the alkaloids from this extract by shaking with 200 ml. portions of half molar phosphoric acid, then decolorize and filter the combined acid waters. Adjust the pH of the acid solution to the range 4.0–4.5 and extract by shaking with successive 100 ml. portions of chloroform. Combine the chloroform extract, dry with sodium sulfate and distill the chloroform to obtain an amorphous residue. Reflex the residue with methanol for 15 minutes, chill and filter the crystals. Dissolve these crystals in a minimum volume of hot ethanol containing sufficient hydrochloric acid to render the solution acid to Congo paper, chill the solution, and filter the crystals of solvated raunitidine hydrochloride. These have the same properties as the product of Example 4. Prepare pure raunitidine from the salt in the manner described in Example 5. This material corresponds to the raunitidine described in Example 5.

I claim:

1. The process of separating raunitidine from alkaloidal extracts containing the same, which comprises the steps of concentrating the raunitidine by refluxing the extract with a saturated lower aliphatic alcohol chilling the alcoholic mixture, recovering the concentrate from the liquid, dissolving the crystalline alkaloid concentrate in a warm saturated lower-aliphatic alcohol that is acidified with hydrochloric acid, chilling the resultant solution, recovering the chilled solution the raunitidine hydrochloride salt which crystallizes and neutralizing the salt with an alkaline material to liberate raunitidine.

2. The process according to claim 1 wherein the lower-aliphatic alcohol for refluxing is methanol.

3. The process according to claim 1 wherein the lower-aliphatic alcohol that is acidified is ethanol.

4. The process for separating raunitidine from other 11-methoxy-δ-yohimbine isomers which comprises the steps of forming the crystalline, solvated hydrochloride of raunitidine by dissolving the alkaloid mixture in a saturated lower-aliphatic alcohol, acidified with hydrochloric acid, chilling the solution and removing, raunitidine which precipitates as the hydrochloride.

5. The process for the manufacture of raunitidine which comprises the steps of extracting the leaves of rauwolfia plants containing raunitidine in conjugated form, with a water-immiscible solvent for alkaloids selected from the group consisting of chloroform, ethylene chloride, methylene chloride, trichloroethylene, tetrachloroethylene, tetrachlorethane, benzene, toluene, xylene and ethylbenzene, dissolving the extract in an acid solution, adjusting the pH of the acid solution above 4.0 in the presence of a solvent selected from the above-mentioned group of water-immiscible solvents for alkaloids, effecting a transfer of liberated alkaloids from the adjusted solution to said solvent, distilling the solvent, recovering the residue of purified amorphous alkaloids, refluxing the residue of amorphous alkaloids with a lower saturated aliphatic alcohol, chilling the reflux mixture, removing the crystallized crude, raunitidine concentrate, dissolving same in warm HCl-alcohol, chilling the alcohol, recovering the crystals of the precipitated hydrochloride salt, suspending the salt in an alkaloidal solvent mixture, decomposing said salt by alkali and recrystallizing, from methanol, the pure raunitidine recovered by the evaporation of the solvent mixture.

6. The process for the manufacture of raunitidine which comprises the steps of extracting the leaves of rauwolfia plants containing raunitidine in conjugated form, with a water-immiscible solvent for alkaloids selected from the group consisting of chloroform, ethylene chloride, methylene chloride, trichloroethylene, tetrachloroethylene, tetrachlorethane, benzene, toluene, xylene and ethylbenzene, dissolving the extract in an acid solution, adjusting the pH of the acid solution above 4.0 in the presence of chloroform as a solvent, effecting a transfer of liberated alkaloids from the adjusted solution to said solvent, distilling the solvent, recovering the residue of purified amorphous alkaloids, refluxing the residue of amorphous alkaloids with a lower saturated aliphatic alcohol, chilling the reflux mixture, removing the crystallized, crude, raunitidine-concentrate, dissolving same in warm HCl-alcohol, chilling the alcohol, recovering the crystals of the precipitated hydrochloride salt, suspending the salt in an alkaloid solvent mixture, decomposing said salt by alkali and recrystallizing, from methanol, the pure raunitidine recovered by the evaporation of the solvent mixture.

References Cited in the file of this patent

Fieser et al.: Organic Chemistry, 3rd ed. (1956), p. 267.

Djerassi et al.: Jour. Amer. Chem. Soc., vol. 79 (Mar. 5, 1957), pp. 1217–1222.